N. DUNN.
PROPAGATION POT OR CAN.
APPLICATION FILED DEC. 16, 1918.
1,297,810.
Patented Mar. 18, 1919.
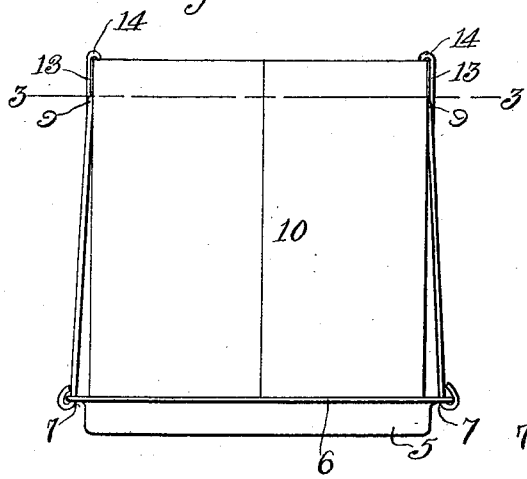
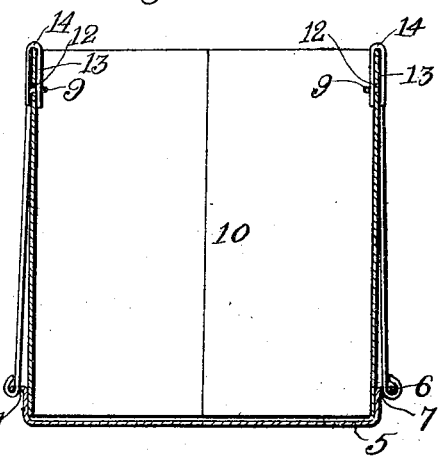
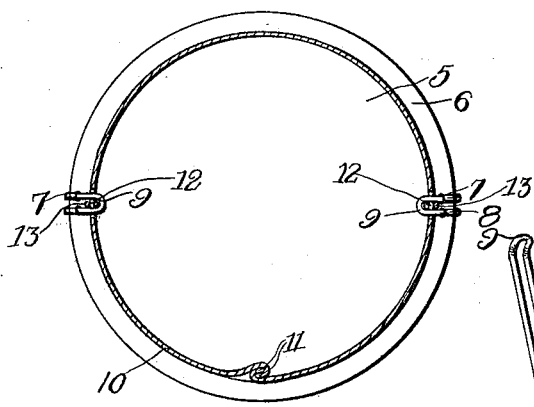
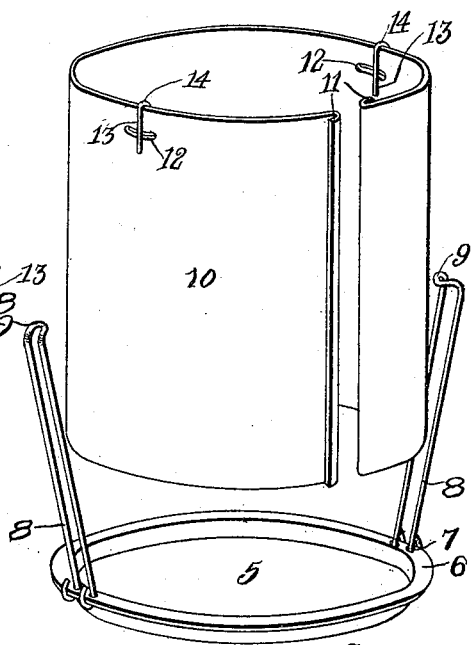
Witnesses
Everett Lloyd Jr.
Inventor
Nellie Dunn
By Victor J. Evans
Attorney

UNITED STATES PATENT OFFICE.

NELLIE DUNN, OF ESCANABA, MICHIGAN.

PROPAGATION POT OR CAN.

1,297,810.  Specification of Letters Patent.  Patented Mar. 18, 1919.

Application filed December 16, 1918. Serial No. 266,924.

*To all whom it may concern:*

Be it known that I, NELLIE DUNN, a citizen of the United States, residing at Escanaba, in the county of Delta and State of Michigan, have invented new and useful Improvements in Propagation Pots or Cans, of which the following is a specification.

This invention has reference to the art of horticulture.

Plants receiving their first growth in green houses or in windows are generally placed in cans, pots or boxes. In the transplanting of such plants it is a hard matter to remove the same from the can, pot or box without disturbing the roots or interfering with the earth that surrounds the roots, and as a consequence the growth of the transplanted plants is retarded and the roots so injured as to destroy the plant.

It is the object of the present invention to produce a receptacle, in the nature of a pot or can designed to receive the roots of a plant therein and to hold the plant during the first or partial growth thereof, before it is necessary to transfer the plant to the open ground, wherein, when such transfer is necessary the plant and the earth surrounding the roots of the plant may be removed from the can or pot without disturbing the earth or the roots.

It is a further object of the invention to produce a device of this character comprising a body portion in the nature of a band having means whereby the edges thereof co-engage, so that the same is cylindrical when set up. The body has arranged thereon a removable bottom provided with means for latching the same to the body. This arrangement permits of the body being first separated from the bottom, and thereafter the edges of the body released one from the other so that the body may be spread or opened and so that the soil surrounding the roots of the plant will not be disturbed when the plant is removed from the receptacle.

It is a further object of the invention to produce a pot or can of this character that shall be of an extremely simple construction, cheap to manufacture, and thoroughly efficient for the purpose for which it is devised.

Other objects and advantages will present themselves as the nature of the invention is better understood, reference being had to the accompanying drawings, in which:

Figure 1 is a view of the improvement.

Fig. 2 is a sectional view approximately on the line 2—2 of Fig. 1.

Fig. 3 is a sectional view approximately on the line 3—3 of Fig. 1.

Fig. 4 is a view showing the manner in which the body is released from the bottom and the edges of the body disengaged, as when a plant is to be removed from the device.

As disclosed by the drawings, the base or bottom 5 of the improvement comprises a flat round member having a peripheral flange 6. The flange, at diametrically opposite points has pivotally secured thereto, as at 7 latch members 8. Preferably, and as illustrated by the drawings, the latch members are each constructed from a single strand of wire bent upon itself to provide parallel legs, the outer end of the said legs being rounded and passed through openings in the flange, and the connecting portion of the said legs is bent inwardly as indicated by the numerals 9, the said bent portions providing what I will term the lips of the catch member.

The body 10 is preferably constructed from a single sheet of bendable material, such as tin or the like. The confronting edges of the body are bent upon themselves to provide oppositely disposed lips 11, the said lips designed to interengage, whereby to hold the body in the form of a band or cylinder. The cylindrical body is of a size to be received in the flange 6 of the base 5, and the said body has at diametrically opposed points, transverse slots 12 designed to receive therein the lips 9 of the latch members 8. The frictional engagement between the lips of the said latch members and the lower walls of the slots 12 may be sufficient to hold the latches in locking engagement with the cylindrical body, but preferably I pass through the lips 12 the straight wire members 13 that have their outer ends rounded or bent upon themselves as at 14 whereby to overlie the outer edge of the cylindrical body.

It will be apparent that when the elements 13 are removed the latch members may be swung away from the body. The body may be removed from the base or bottom and a slight inward pressure at the confronting edges thereof will bring the lips 11 out of engagement with each other, so that the plant may be removed without inflicting injury to the roots thereof or without interfering with the dirt that surrounds the roots.

The body 10 may be used as a protector against cut worms or other insects by arranging the same around the plant and connecting the edges thereof, and thereafter forcing the lower edge of the body into the earth. This, of course, refers to plants that are already transplanted.

It is thought, from the foregoing description, when taken in connection with the drawings, the simplicity and advantages of the construction will be readily apparent without further detailed description.

Having thus described the invention, what is claimed as new, is:—

In a device for the purpose set forth, a body comprising a flat sheet of bendable material having the confronting edges thereof provided with oppositely disposed lips designed to interengage to hold the body in a cylindrical form, said body having transverse slots therethrough, a flanged base designed to receive the body when the same is set up as a cylinder, pivoted catch members on the base, lips on the ends of said catch members designed to be received in the referred to slots in the body, and removable elements supported on the upper edge of the body passing through the lips for holding the latch members connected to the body.

In testimony whereof I affix my signature.

NELLIE DUNN.

Copies of this patent may be obtained for five cents each, by addressing the "Commissioner of Patents, Washington, D. C."